United States Patent
Wang et al.

(10) Patent No.: US 11,622,066 B2
(45) Date of Patent: Apr. 4, 2023

(54) FLASH ARRAY FOR PORTABLE CAMERA SYSTEM

(71) Applicant: Black Sesame International Holding Limited, Santa Clara, CA (US)

(72) Inventors: Chao Wang, Shanghai (CN); Donghui Wu, San Mateo, CA (US); Jizhang Shan, Los Gatos, CA (US)

(73) Assignee: Black Sesame Technologies Inc., San Jose, CA (US)

( * ) Notice: Subject to any disclaimer, the term of this patent is extended or adjusted under 35 U.S.C. 154(b) by 0 days.

(21) Appl. No.: 17/079,081

(22) Filed: Oct. 23, 2020

(65) Prior Publication Data
US 2022/0132009 A1 Apr. 28, 2022

(51) Int. Cl.
*H04N 5/225* (2006.01)
*F21V 23/04* (2006.01)
*F21Y 115/10* (2016.01)
*H04N 5/235* (2006.01)

(52) U.S. Cl.
CPC ....... *H04N 5/2256* (2013.01); *F21V 23/0442* (2013.01); *F21Y 2115/10* (2016.08); *H04N 5/235* (2013.01)

(58) Field of Classification Search
CPC ... F21V 23/0442; H04N 5/235; H04N 5/2256
See application file for complete search history.

(56) References Cited

U.S. PATENT DOCUMENTS

| | | | | |
|---|---|---|---|---|
| 7,682,042 B2* | 3/2010 | Feinbloom | ............ | F21V 14/06 362/249.03 |
| 7,862,207 B2* | 1/2011 | Baldwin | ............ | G01N 21/9501 362/249.07 |
| 8,301,024 B2* | 10/2012 | Mather | ............ | H04M 19/048 396/176 |
| 8,428,644 B1* | 4/2013 | Harooni | ............ | H04B 1/3888 362/551 |
| 9,740,083 B1* | 8/2017 | Hennings | ............ | H04N 5/2354 |
| 10,190,751 B2* | 1/2019 | JOrgensen | ............ | F21V 5/008 |
| 10,503,205 B2* | 12/2019 | Spevak | ............ | G03B 17/56 |
| 2015/0036354 A1* | 2/2015 | Adams | ............ | F21V 7/0083 362/311.02 |
| 2015/0244908 A1* | 8/2015 | Laroia | ............ | G02B 27/0955 348/344 |
| 2015/0355525 A1* | 12/2015 | Abrams | ............ | F21L 4/00 348/207.11 |

* cited by examiner

Primary Examiner — Arman B Fallahkhair
(74) Attorney, Agent, or Firm — Timothy T. Wang; Ni, Wang & Massand, PLLC

(57) ABSTRACT

A distributed light source couple-able to a mobile device, comprising, a distributed array of light emitting points and a mount connected to the distributed array and couple-able to the mobile device, the distributed array capable of light emission from a plurality of areas.

14 Claims, 16 Drawing Sheets

FLASH ARRAY FOR PORTABLE CAMERA SYSTEM

BACKGROUND

Technical Field

The instant disclosure is related to digital photography and more specifically to a flash array for a portable camera system.

Background

Portable camera systems are popular and nearly ubiquitous in portable smart apparatus such as smart phones. In many smart phones, the flash is designed as a spotlight source which may lead to stark shadows and reflections. Professional photographers may use a reflector to diffusely illuminate a scene and capture images with softer illumination.

SUMMARY

In one embodiment, a distributed light source couple-able to a mobile device, comprising, a distributed array of light emitting points and a mount connected to the distributed array and couple-able to the mobile device, the distributed array capable of light emission from a plurality of areas.

In another embodiment, a distributed light source couple-able to a mobile device, comprising, a light gathering layer that gathers light from at least one light source, a distributed array of light emitting optical foci optically coupled to the light gathering layer wherein the distributed array gathers light from the light gathering layer and outputs the light from the light emitting optical foci and a mount connected to the distributed array and couple-able to the mobile device, the distributed array capable of light emission from a plurality of areas.

DETAILED DESCRIPTION OF THE INVENTION

The embodiments listed below are written only to illustrate the applications of this apparatus and method, not to limit the scope. The equivalent form of modifications towards this apparatus and method shall be categorized as within the scope the claims.

Certain terms are used throughout the following description and claims to refer to particular system components. As one skilled in the art will appreciate, different companies may refer to a component and/or method by different names. This document does not intend to distinguish between components and/or methods that differ in name but not in function.

In the following discussion and in the claims, the terms "including" and "comprising" are used in an open-ended fashion, and thus should be interpreted to mean "including, but not limited to . . . " Also, the term "couple" or "couples" is intended to mean either an indirect or direct connection. Thus, if a first device couples to a second device that connection may be through a direct connection or through an indirect connection via other devices and connections.

Figure 1:
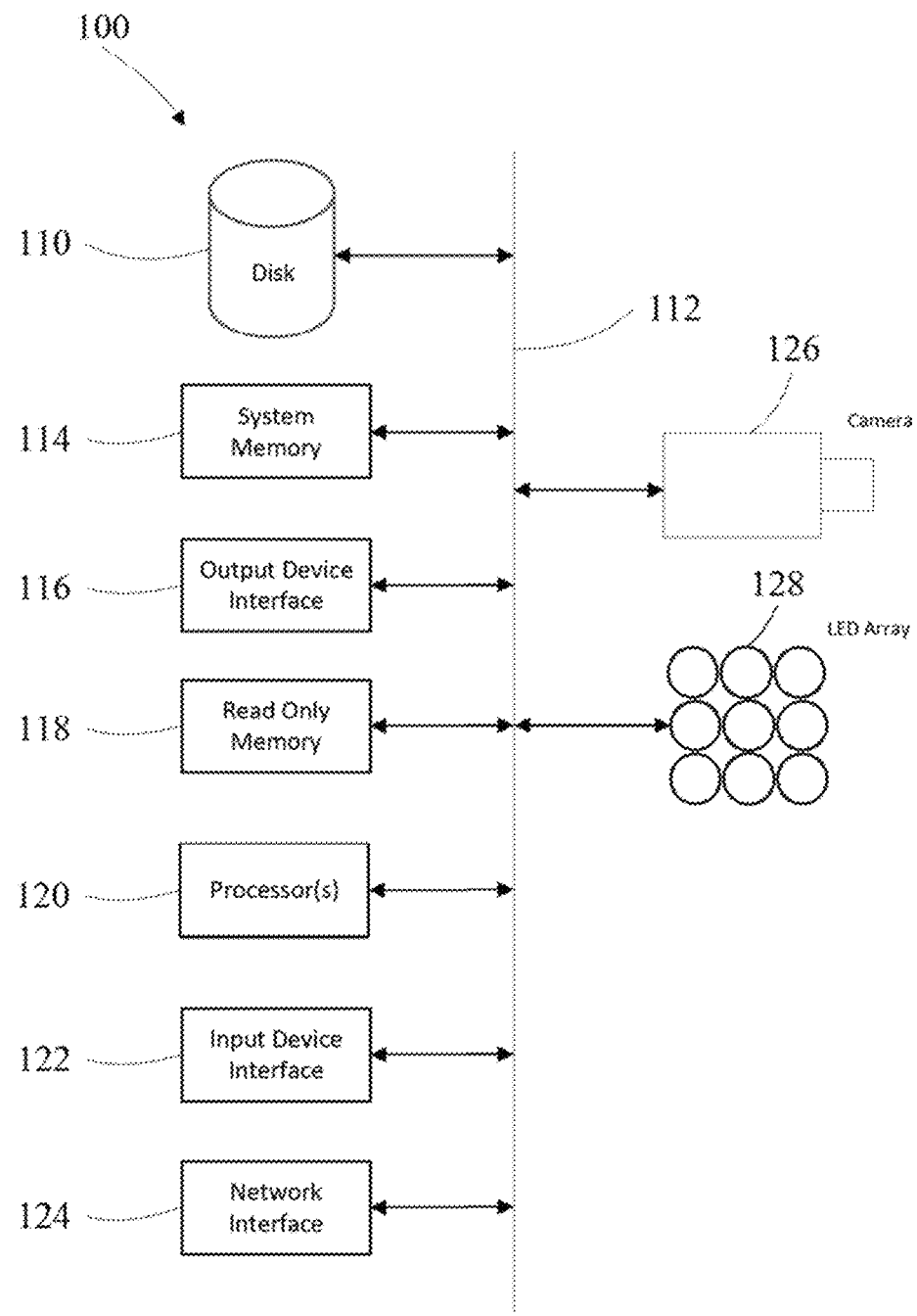
FIG. 1 is a system diagram in accordance with one embodiment of the disclosure.

FIG. 1 depicts an example electronic system for use in connection with a system having three cameras. Electronic system 100 may be a computing device for execution of software associated with the operation of one or more portions or steps of the flash process. Electronic system 100 may be an embedded computer, personal computer or a mobile device such as a tablet computer, laptop, smart phone, PDA, or other touch screen or television with one or more processors embedded therein or coupled thereto, or any other sort of computer-related electronic device.

Electronic system 100 may include various types of computer readable media and interfaces for various other types of computer readable media. In the depicted example, electronic system 100 includes a bus 112, processor(s) 120, a system memory 114, a read-only memory (RON) 118, a permanent storage device 110, an input device interface 122, an output device interface 116, and one or more network interfaces 124. In some implementations, electronic system 100 may include or be integrated with other computing devices or circuitry for operation of the various components and processes previously described. In one embodiment of the present disclosure the processor(s) 120 is coupled through the bus 112 to a camera module sensor 126 and a distributed flash array 128.

Bus 112 collectively represents all system, peripheral, and chipset buses that communicatively connect the numerous internal devices of electronic system 100. For instance, bus 112 communicatively connects processor(s) 120 with ROM 118, system memory 114, permanent storage device 110, a camera module sensor 126 and a distributed flash array 128.

From these various memory units, processor(s) 120 retrieves instructions to execute and data to process in order to execute the processes of the subject disclosure. The processing unit(s) can be a single processor or a multi-core processor in different implementations.

ROM 118 stores static data and instructions that are needed by processor(s) 120 and other modules of the electronic system. Permanent storage device 110, on the other hand, is a read-and-write memory device. This device is a non-volatile memory unit that stores instructions and data even when electronic system 100 is off. Some implementations of the subject disclosure use a mass-storage device (such as a magnetic or optical disk and its corresponding disk drive) as permanent storage device 110.

Other implementations use a removable storage device (such as a floppy disk, flash drive, and its corresponding disk drive) as permanent storage device 110. Like permanent storage device 110, system memory 114 is a read-and-write memory device. However, unlike permanent storage device 110, system memory 114 is a volatile read-and-write memory, such a random access memory. System memory 114 stores some of the instructions and data that the processor needs at runtime. In some implementations, the processes of the subject disclosure are stored in system memory 114, permanent storage device 110, and/or ROM 118. From these various memory units, processor(s) 120 retrieves instructions to execute and data to process in order to execute the processes of some implementations.

Bus 112 also connects to input and output device interfaces 122 and 116. Input device interface 122 enables the user to communicate information and select commands to the electronic system. Input devices used with input device interface 122 include, for example, alphanumeric keyboards and pointing devices (also called "cursor control devices"). Output device interfaces 116 enables, for example, the display of images generated by the electronic system 100. Output devices used with output device interface 116 include, for example, printers and display devices, such as cathode ray tubes (CRT) or liquid crystal displays (LCD). Some implementations include devices such as a touchscreen that functions as both input and output devices.

Finally, as shown in FIG. 1, bus 112 may also couple electronic system 100 to a network (not shown) through network interfaces 124. Network interfaces 124 may include, for example, a wireless access point (e.g., Bluetooth or WiFi) or radio circuitry for connecting to a wireless access point. Network interfaces 124 may also include hardware (e.g., Ethernet hardware) for connecting the computer to a part of a network of computers such as a local area network ("LAN"), a wide area network ("WAN"), wireless LAN, or an Intranet, or a network of networks, such as the Internet. Any or all components of electronic system 100 can be used in conjunction with the subject disclosure.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself.

As used in this specification and any claims of this application, the terms "computer". "server", "processor", and "memory" all refer to electronic or other technological devices. These terms exclude people or groups of people. For the purposes of the specification, the terms display or displaying means displaying on an electronic device.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. Data generated at the client device (e.g., a result of the user interaction) can be received from the client device at the server.

In a conventional camera, a pixel collects the light passing through the lens from an object point outside the camera. An object P outside the camera emits or reflects the light. The light entering the lens aperture will be accumulated by the pixel.

The pixel output value is approximately proportional to the number of photons collected. When illumination is poor, the content in the scene may not be well lighted, the sensor may be unable to collect sufficient photons, and thus the content may be dark in the picture.

One way to illuminate such content is to add additional light. One possible solution is to use a flash, which adds additional light and illuminates the subject. Another is to use a reflector, which redirects some light in the scene to illuminate the subject. The reflector may be large and may not be suitable for the portable camera system like a smartphone.

Typically, a single LED flash is small in size, 3-5 mm and emits light as a spot light source. In conventional phones with multiple LED flashes, the flashes are densely packed and the total size is typically less than 8-10 mm, also leading to emission of light as a pseudo-spot light source. In the case where the phone has multiple LED flashes, these are generally designed with different colors which may simulate an environmental color temperature. The flash may still be regarded as a spot light source, because its size is typically less than 1 cm, compared to a general photo distance of 1 to 1.5 m. In both cases the spot light source is referred to as a flash unit.

Figure 2:
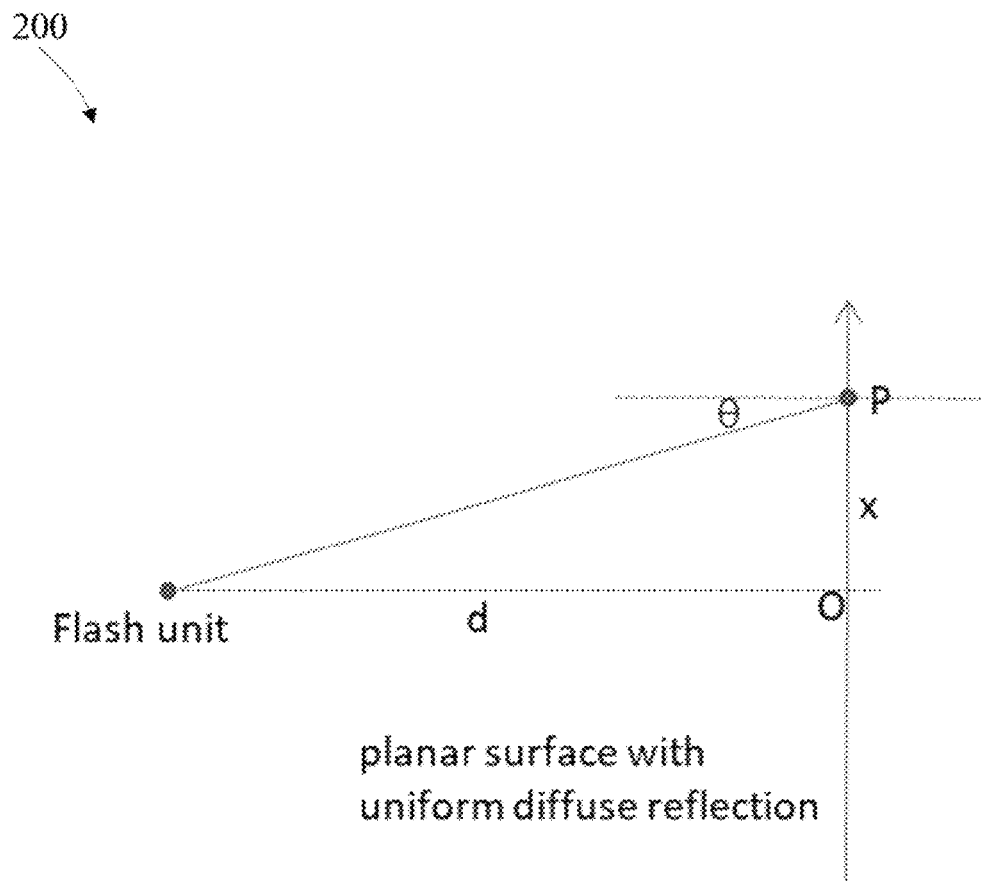
FIG. 2 depicts a single flash unit model.

FIG. 2 depicts a typical flash that provides a spot light source with intensity L, the radiance E due to direct illumination from the flash on surface point P is $$E = L \cdot \rho(\omega_f, \omega_c) \cdot r^{-2} \cdot \cos\theta \qquad (1)$$

where $\rho(\omega_f, \omega_c)$ is the surface BRDF (bidirectional reflectance distribution function), $\omega_f$ and $\omega_c$ are flash and view directions with respect to a local coordinate frame at P. Where r is the distance from the flash, and $\theta$ is the angle between the flash direction and the surface normal at P. This inverse square law is the reason the flash intensity falls off quickly with distance r.

From equation 1, it may be observed that, for an object with curved surface that the illumination decreases quickly with increasing distance r. The distance from the surface to the flash varies and thus different points on the main subject may not be illuminated uniformly. On a curved surface, the angle between flash direction and surface normal constantly varies, and thus the different points on the main subject may not be uniformly illuminated.

To simulate a professional photographer's capture of a portrait image with a large reflector, one possible solution is to use a flash array instead of a flash unit, to increase the uniformity of the illumination.

If equation 1 is extended to a multiple LED system, of N spot-light sources, the effect of the k-th source light on a surface point P is given by, $$E_k = L_k \cdot \rho(\omega_{fk}, \omega_c) \cdot r_k^{-2} \cdot \cos \theta_k \quad (2)$$

The suffix k denotes the k-th light source. The effect of the N different spot-light sources are, $$E = \Sigma_{k=1}^N E_k = \Sigma_{k=1}^N L_k \cdot \rho(\omega_{fk}, \omega_c) \cdot r_k^{-2} \cdot \cos \theta_k \quad (3)$$

If the main axis of flash unit is perpendicular to the surface, the distance between the flash and the surface is d. Then the BRDF of the planar surface with uniform diffuse reflection is set to a uniform distribution function and $\rho(\omega_{fk}, \omega_c)$ is approximately a constant.

For a single flash unit the direct illumination of P by flash unit is given by $$E_{single}(x; d) = \frac{L \cdot p \cdot d}{(x^2 + d^2)^{\frac{3}{2}}} \quad (4)$$

Figure 3:
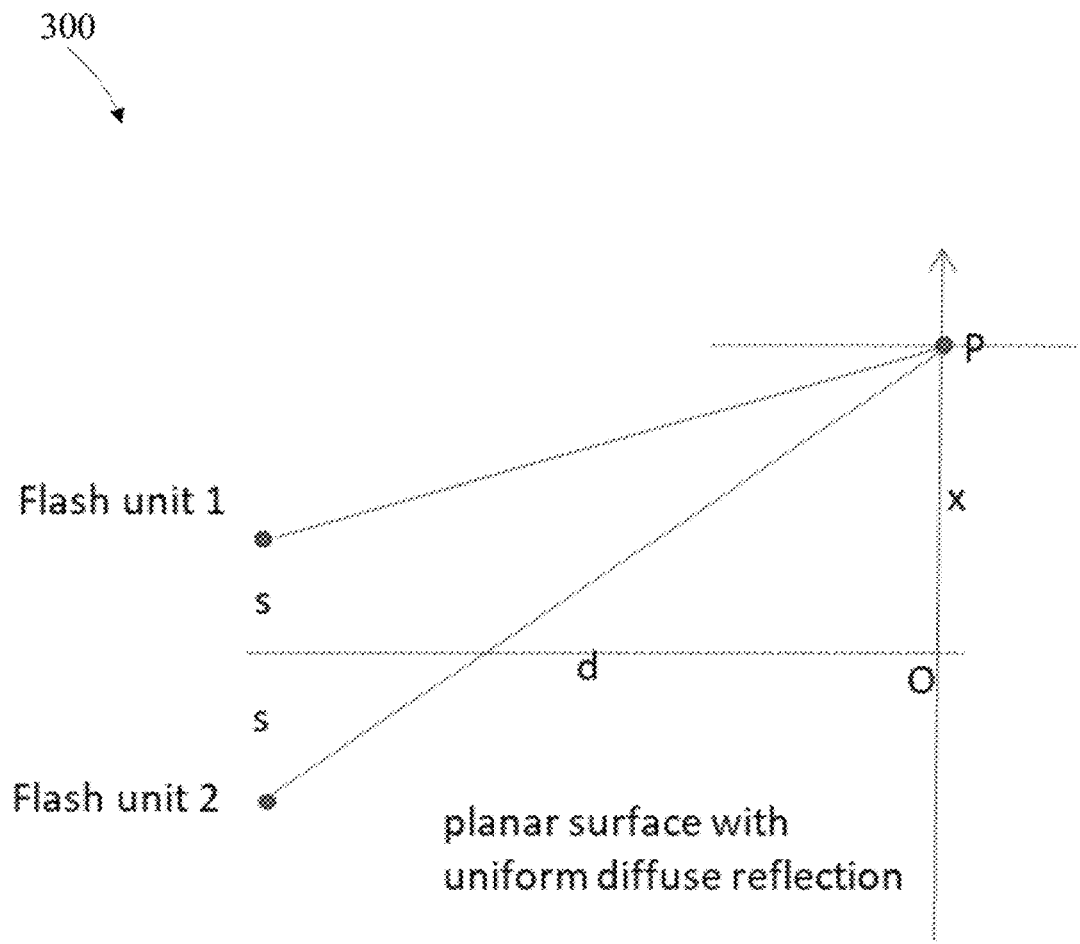
FIG. 3 depicts a dual flash unit model.

FIG. 3 depicts a dual flash unit, the two flash units are separated with space 2s, with center as x=0, and with each flash unit's power halved. The direct illumination at pixel P is a summation of two separate flash units, utilizing equation 4, renders $$E_{dual}(x; d) = \frac{L \cdot p \cdot d}{2((x-s)^2 + d^2)^{\frac{3}{2}}} + \frac{L \cdot p \cdot d}{2((x+s)^2 + d^2)^{\frac{3}{2}}} \quad (5)$$

For N flash units placing on the same distance along a 1D line, with x coordinates as $u_i, i=1, 2, \ldots N$, $$E_N(x; d) = \frac{1}{N} \sum_{i=1}^{N} \frac{L \cdot p \cdot d}{((x-u_i)^2 + d^2)^{\frac{3}{2}}} \quad (6)$$

Multiple flash units illuminate the scene from different directions, and illuminate the scene in a wider view angle, thus improving the uniformity of the illumination area.

Figure 4:
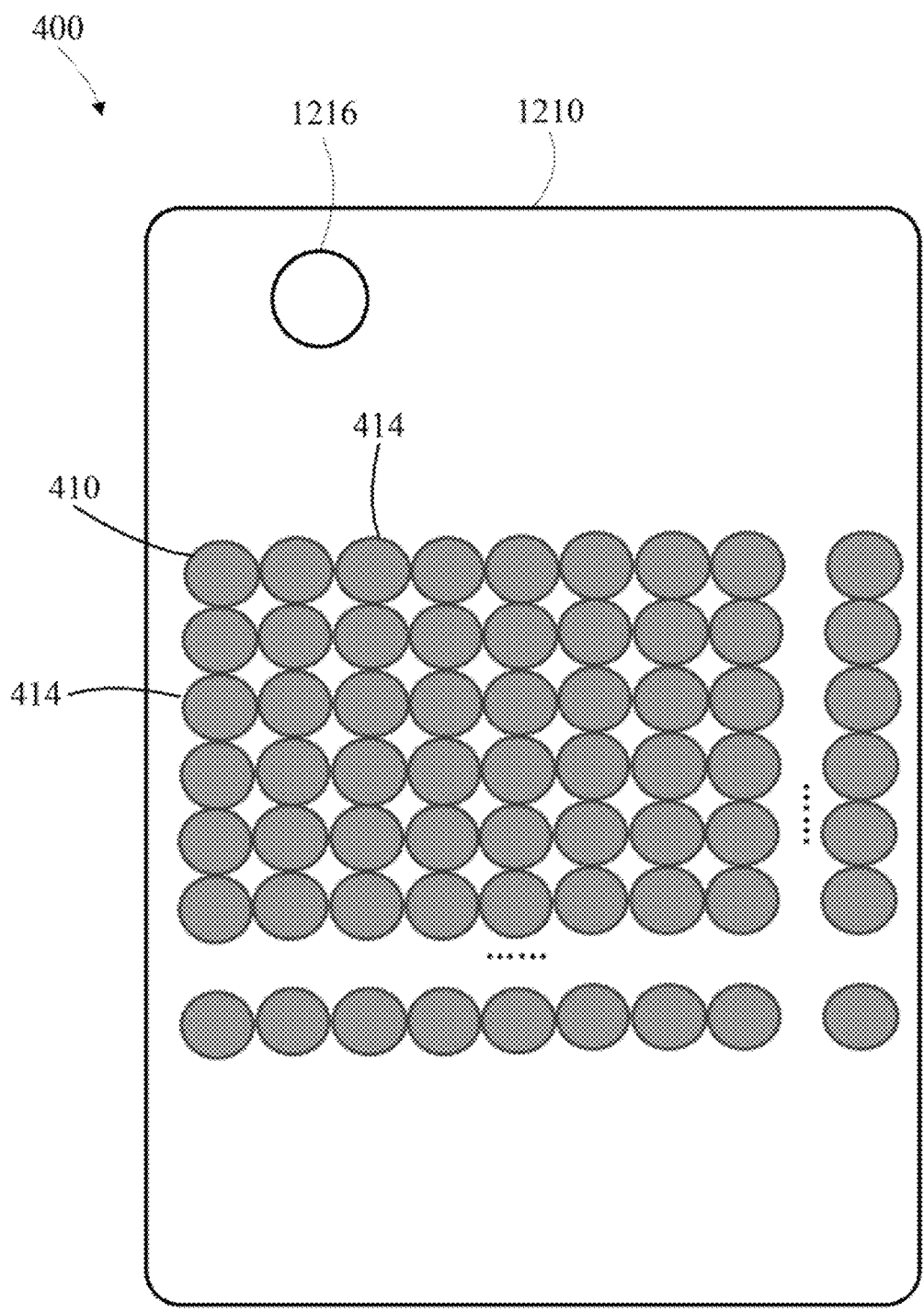
FIG. 4 depicts a two dimensional Cartesian flash array in accordance with one embodiment of the disclosure.

FIG. 4 depicts a top down view of a two-dimensional dense Cartesian flash array. In this example the flash units 410 are closely packed with the two main axes 412 and 414 of each flash on a Cartesian axis. The flash array 410 may be comprised of individual LEDs or individual light emission focal points which redirect photons from a light gathering sub-material and focus the light at the focal points. In this example the LED elements may form rows and columns.

This two dimensional flash array extends the flash view angle along two dimensions, simulating a continuous light source on a 2D plane instead of a spot light source and thus illuminates the object more uniformly than a single flash unit.

The flash array may be used to increase the flash view angle and to make the illumination more uniform. The flash units may be aligned in directions other than orthogonal to the plane of the two dimensional plane, both horizontally and vertically.

Figure 5:
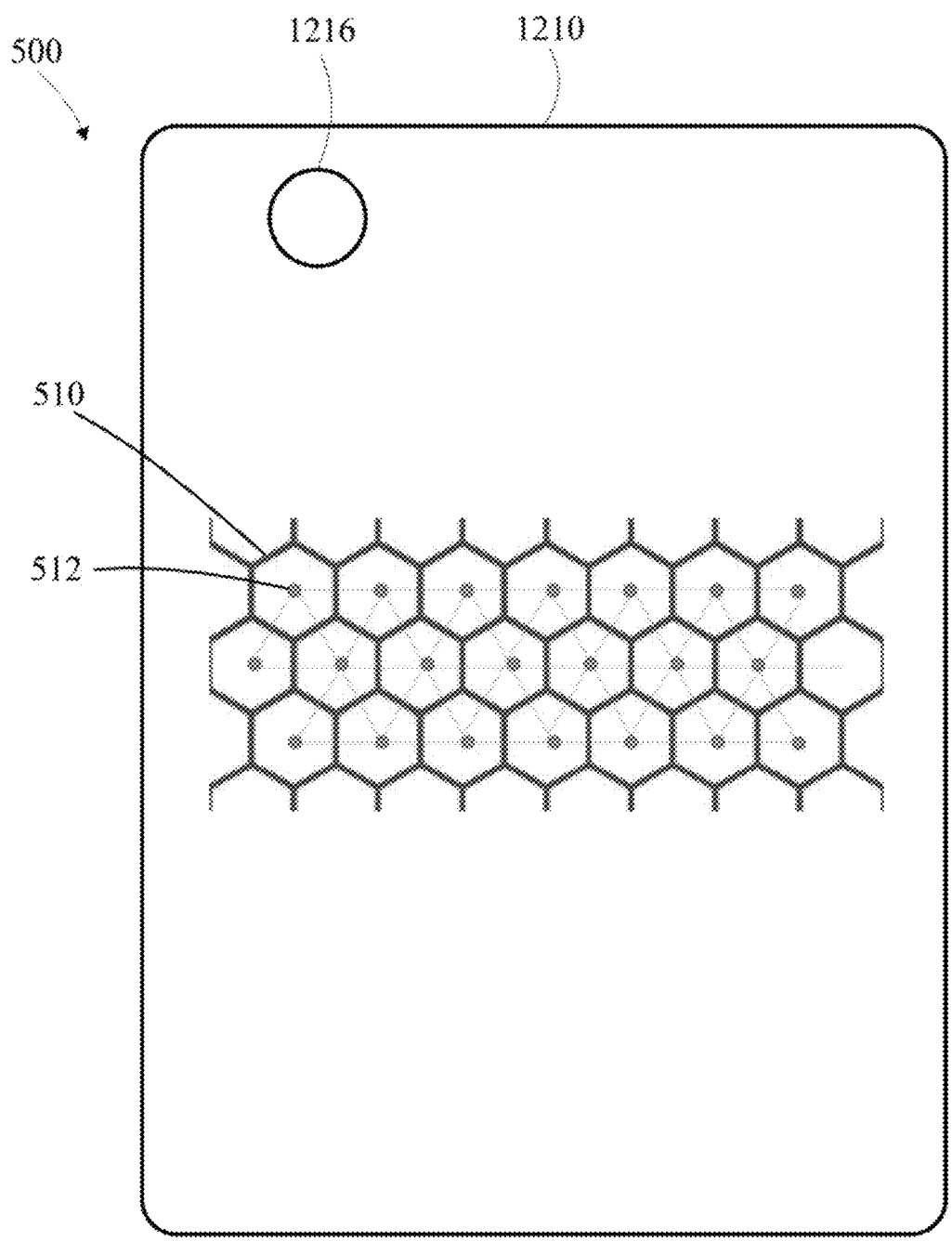
FIG. 5 depicts a two dimensional interleaved flash array in accordance with one embodiment of the disclosure.

FIG. 5 depicts a top down view of an interleaved array where each hexagon 510 is a single flash unit 512 and the flash units are arranged in triangle grids. The interleaved array may take the form of a honeycomb reflector, where each honeycomb has reflection characteristics that may be convex, concave, planar or individually adjustable with respect to the other honeycomb reflectors. The individual honeycombs may also have reflectors of different colors so that the subject receives light with deeper color textures. In other embodiments the individual flash units may be of different colors.

Figure 6:
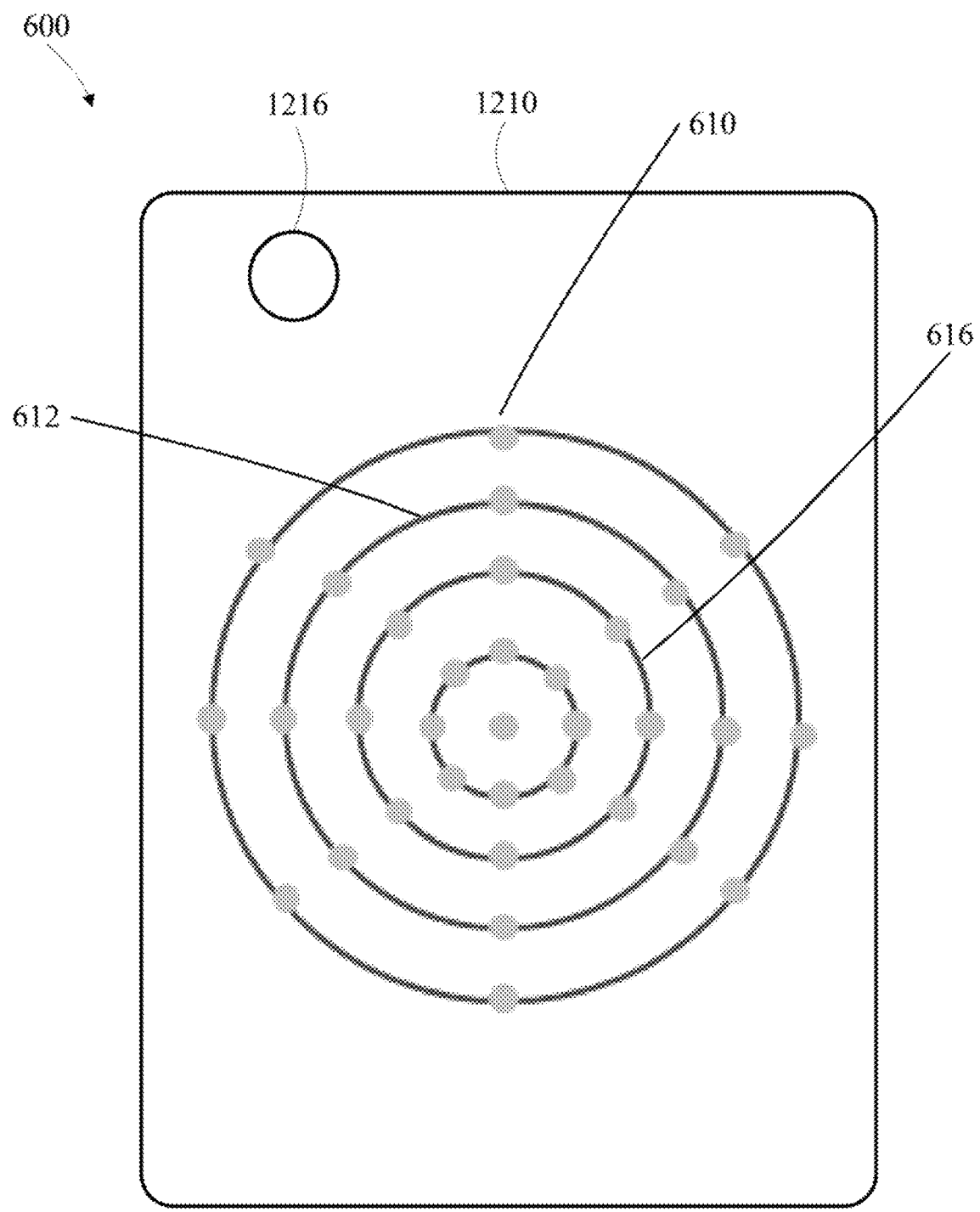
FIG. 6 depicts a two dimensional radial flash array in accordance with one embodiment of the disclosure.

FIG. 6 depicts a top down view of a flash array arranged in concentric circles. In this embodiment the flash units 610 are placed on concentric circles 612, 614, along the radial direction. In this embodiment, each of the concentric circles may be physically adjustable and or rotatable about the x and y axis. In other embodiments each of the concentric circles may have a partial convex or concave shape, or may be planar. In other embodiments each of the concentric circles may have reflection characteristics of different colors so that the subject receives light with deeper color textures. In other embodiments the individual flash units may be of different colors.

Figure 7:
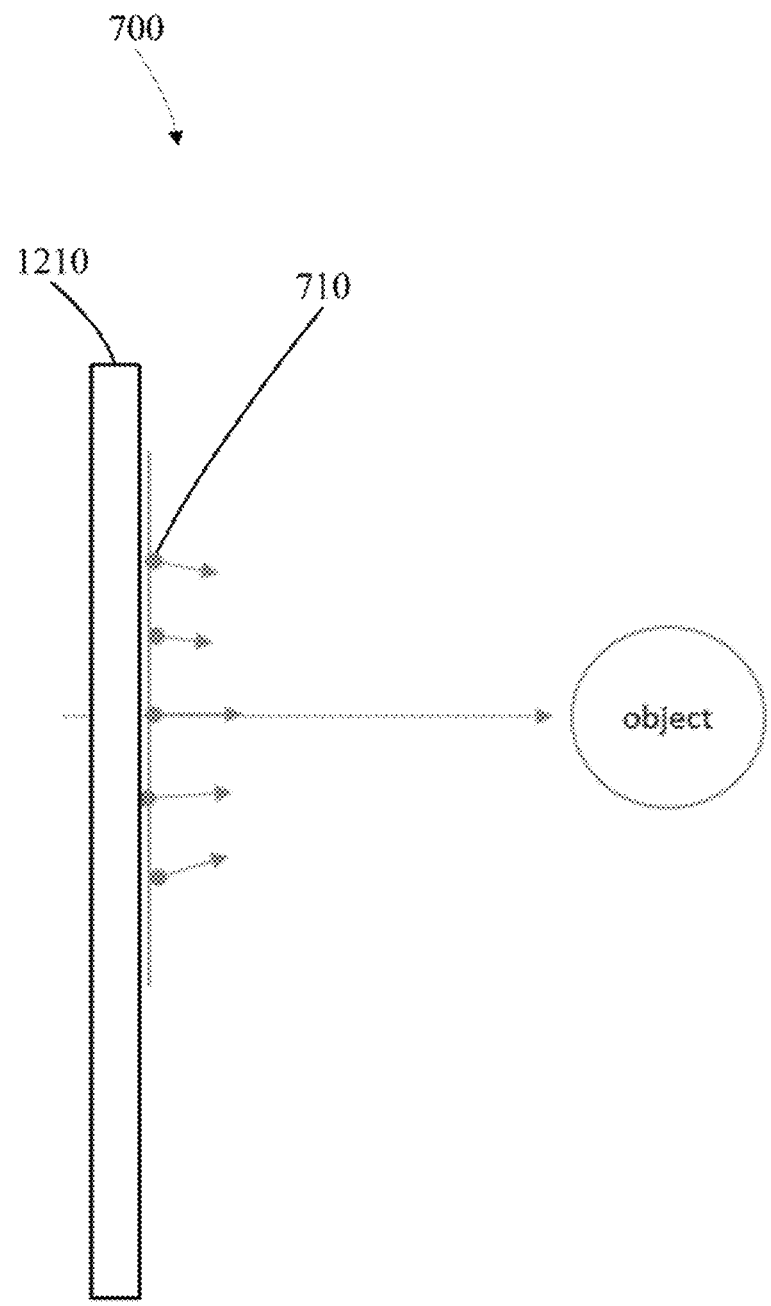
FIG. 7 depicts a two dimensional converging flash array in accordance with one embodiment of the disclosure.

FIG. 7 depicts a cross-section view of a flash unit in which light converges toward an object the flash units 710 have converging focal points. In this figure the dots indicate flash units and the arrows attached to the dots indicate the corresponding main axis of the flash unit. A converging flash axis may illuminate a proximate object from more directions, like a shadow-less lamp over a medical operating table. The flash unit 700 in top down view may have a Cartesian shape, a honeycomb shape, a concentric shape and the like.

Figure 8:
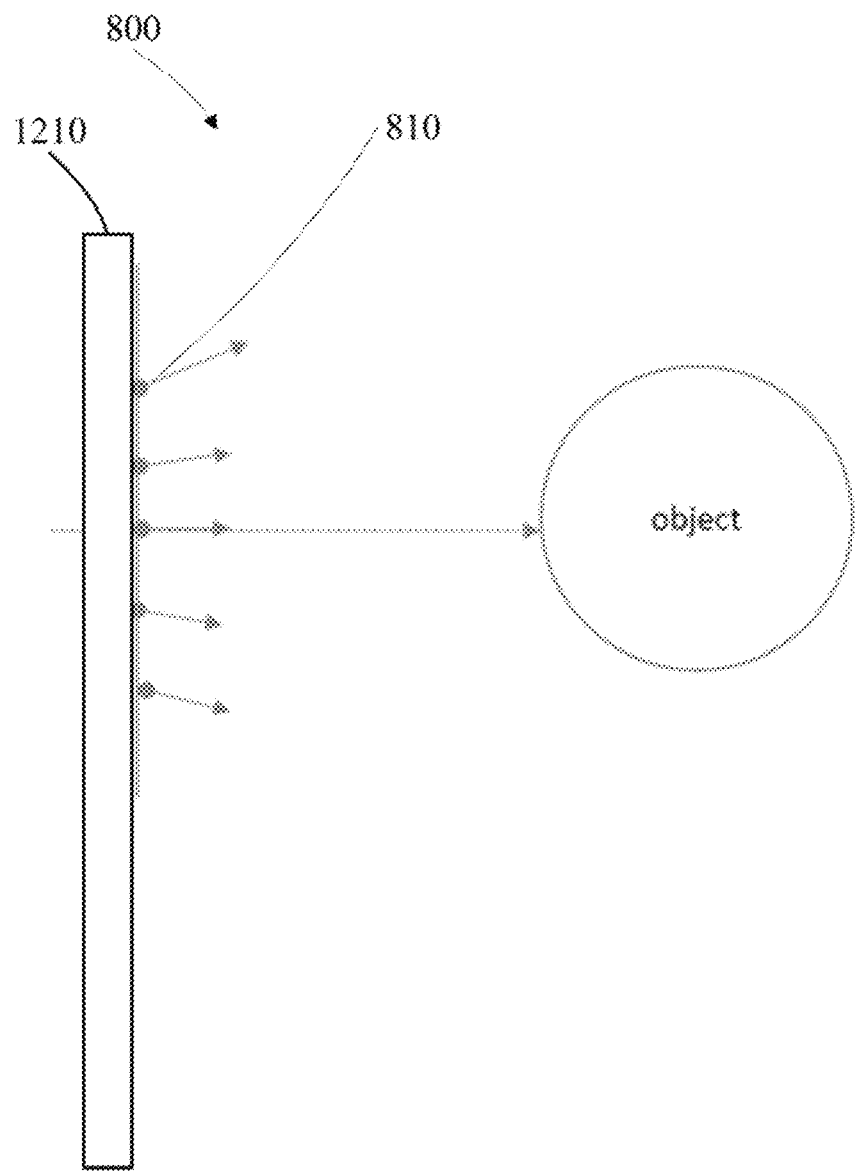
FIG. 8 depicts a two dimensional diverging flash array in accordance with one embodiment of the disclosure.

FIG. 8 depicts a cross-section view of a flash unit in which light diverges away from an object, the flash units 810 have diverging illumination, where the diverging flash axis may illuminate a wider range, and provide more uniformity of an object or a scene. The flash unit 800 in top down view may have a Cartesian shape, a honeycomb shape, a concentric shape and the like.

Figure 9:
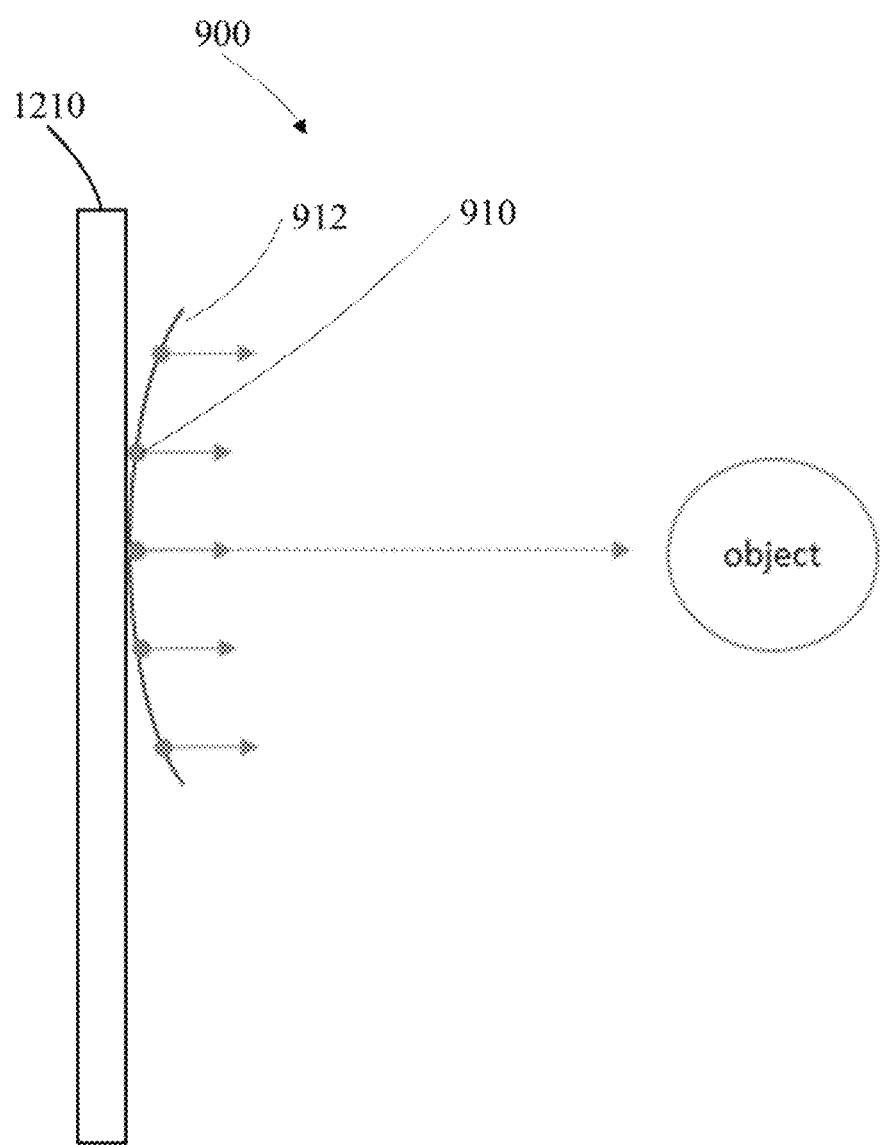
FIG. 9 depicts a two dimensional concave flash array in accordance with one embodiment of the disclosure.

FIG. 9 depicts a cross-section view flash array where the flash units 910 are attached to a concave curved surface 912, or the optical characteristics of the panel provide the optical reflection characteristics of a concave curved reflector. These optical reflection characteristics may be provided by a Fresnel reflector and the like. The flash unit 900 in top down view may have a Cartesian shape, a honeycomb shape, a concentric shape and the like.

Figure 10:
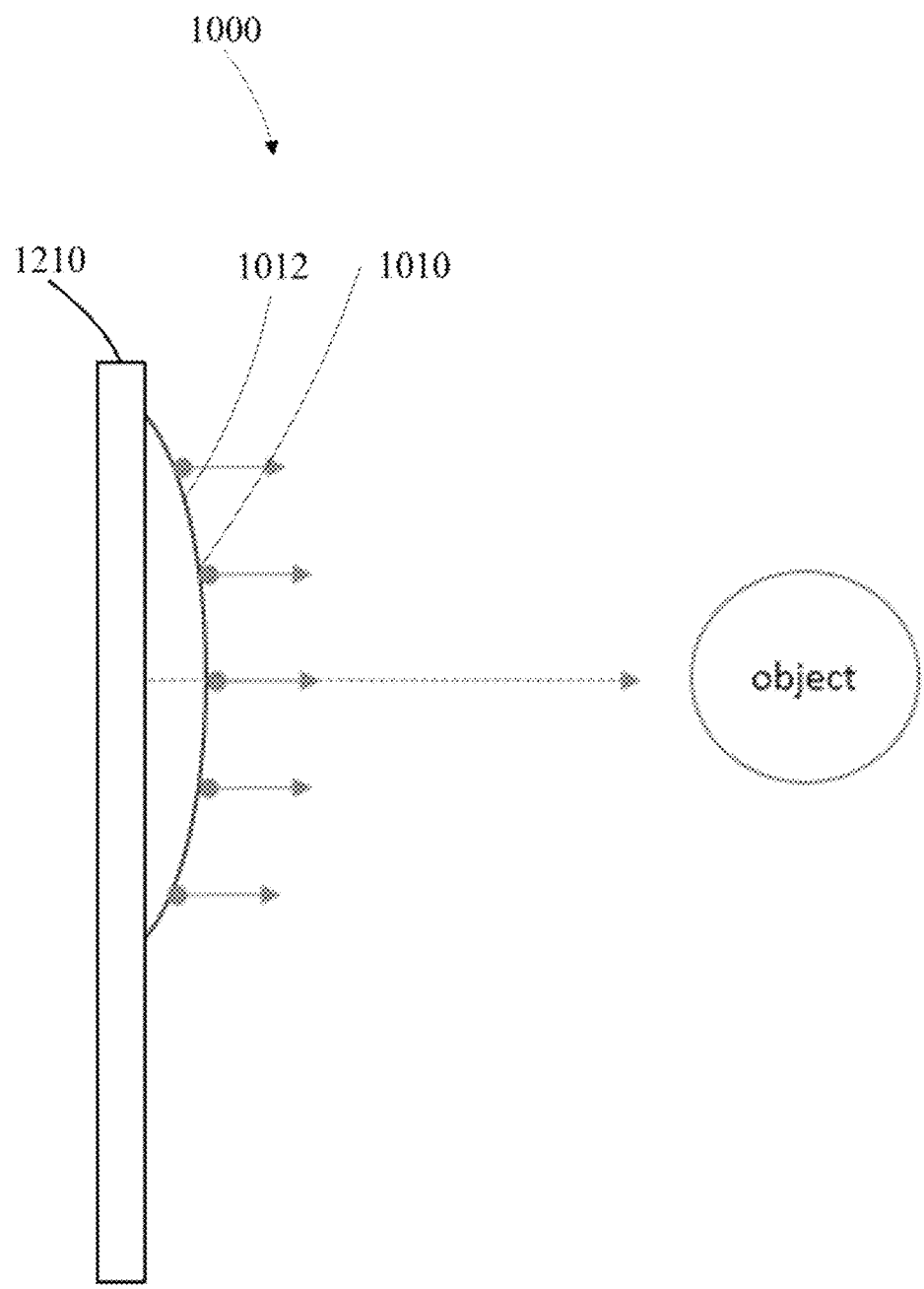
FIG. 10 depicts a two dimensional convex flash array in accordance with one embodiment of the disclosure.

FIG. 10 depicts a cross-section view flash array where the flash units 1010 are attached to a convex curved surface 1012, or the optical characteristics of the panel provide the optical reflection characteristics of a convex curved reflector. These optical reflection characteristics may be provided by a Fresnel reflector and the like. The flash unit 1000 in top down view may have a Cartesian shape, a honeycomb shape, a concentric shape and the like.

The flash axis may be parallel to the inner normal direction as shown in FIG. 9 or the outer normal direction as shown as FIG. 10. Such a surface may be only slightly curved from a planar surface.

Figure 11:
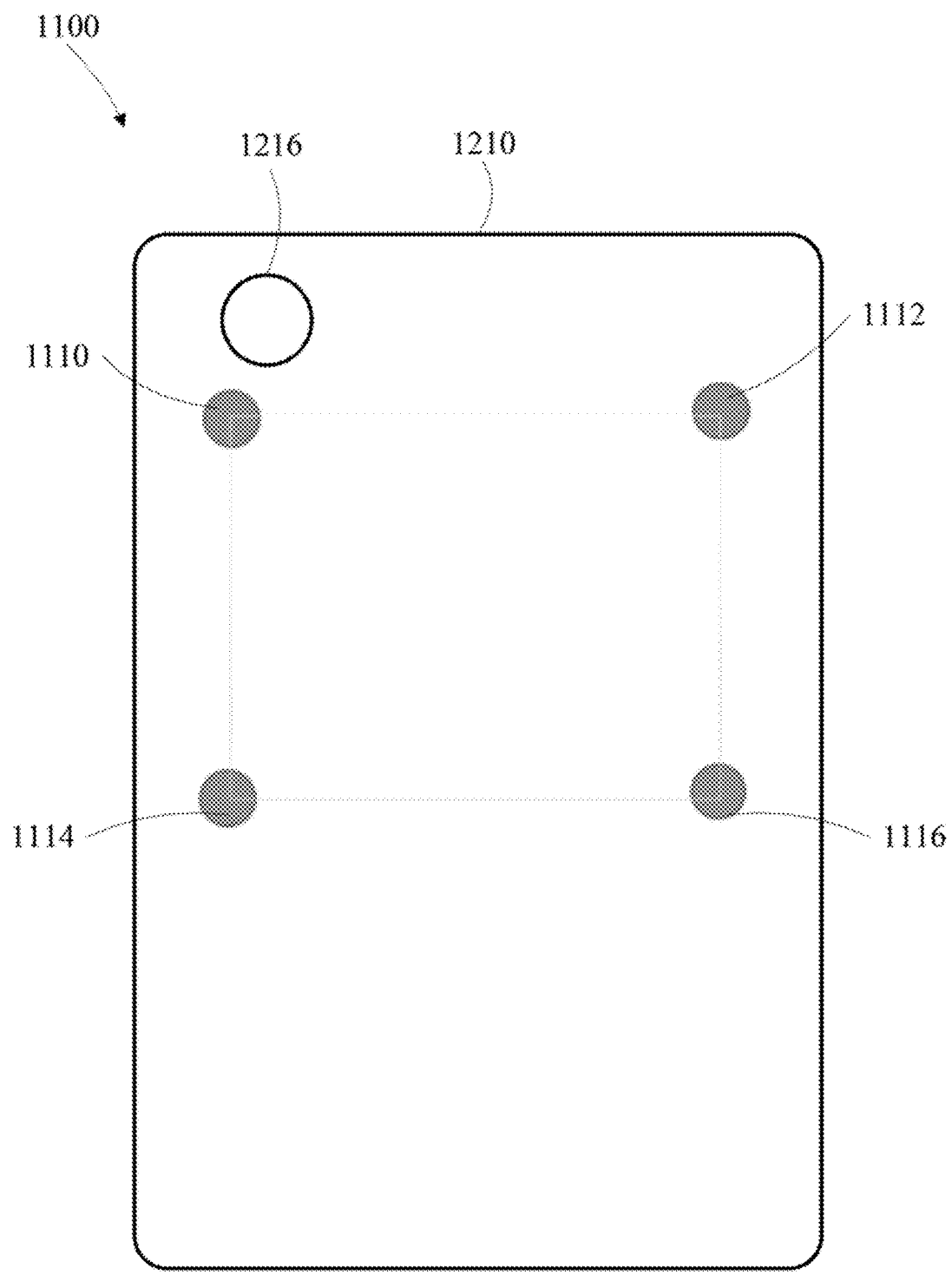
FIG. 11 depicts a two dimensional four corner flash array in accordance with one embodiment of the disclosure.

A dense Cartesian flash array is shown in FIG. 4, the dense array simulates a 2D plane light source and may be simplified by sampling into a sparse Cartesian flash array, for example shown as FIG. 11 that has four flash units at the corners, this sampled array maybe suitable for portable devices due to its small size and reduced power consumption.

The variations discussed may be combined to achieve combined advantages. For example, there may be a sampled flash array on a curved surface, with flash units' axis converging towards an object.

Figure 12:
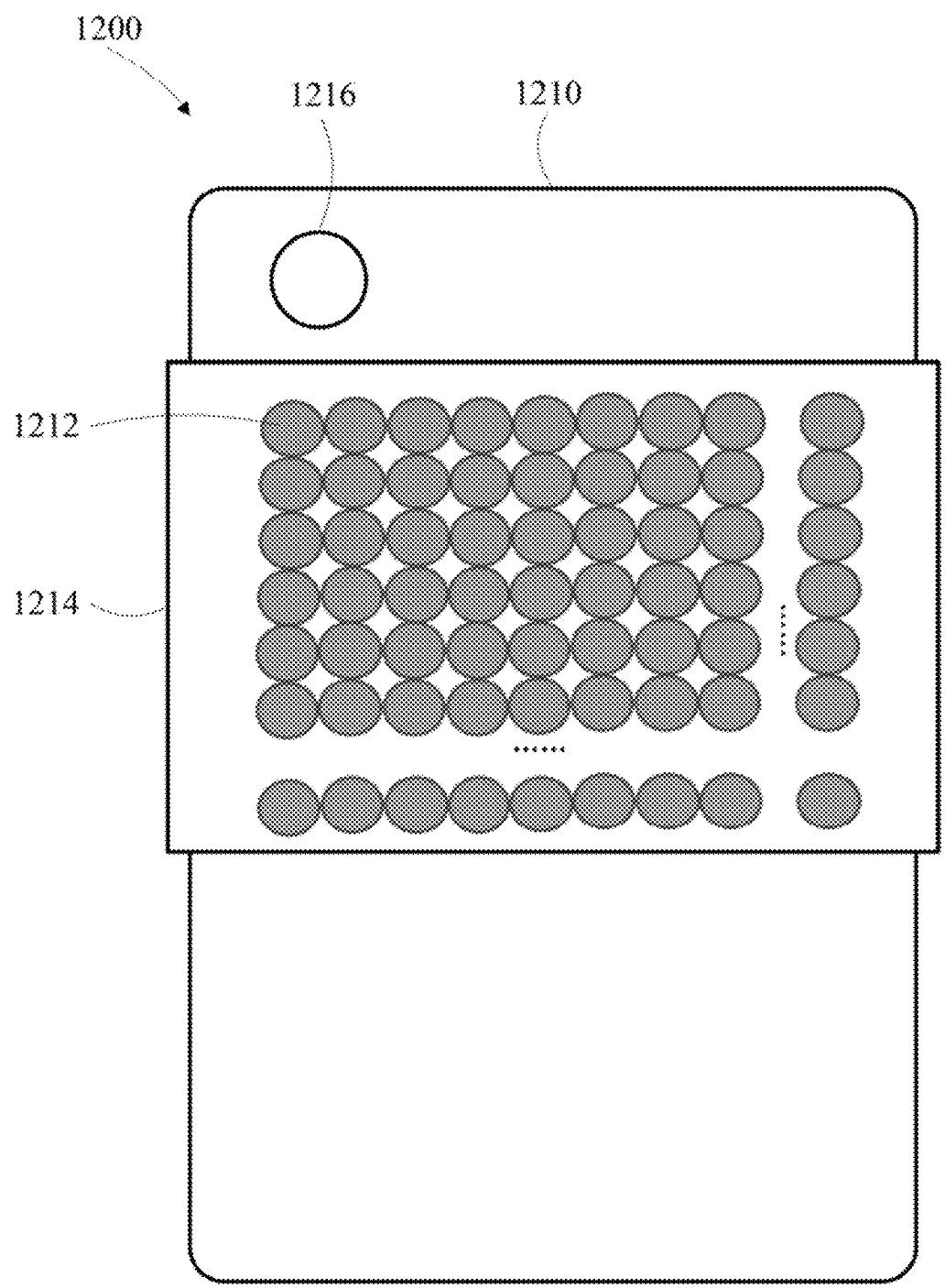
FIG. 12 depicts a two dimensional Cartesian flash array on a cell phone in accordance with one embodiment of the disclosure.

FIG. 12 depicts an example dense Cartesian flash array of FIG. 4 mounted on the back side of a phone. Each of the embodiments may be mounted in this way. A distributed light source 1212 may be coupled to a mobile device 1210 and may include a distributed array of light emitting points and a mount 1214 connected to the distributed array and couple-able to the mobile device having a camera module sensor 1216, the distributed array may be capable of light emission from a plurality of discrete, separated areas or light emission over an extended area. The array of light emitting points may be individual light emitting diodes or alternately optical foci capable of gathering light from a light gathering layer and emitting it from the optical foci. The mount may clip to the mobile device, form a case around the mobile device, be permanently affixed, detachably affixed, slidably affixed, foldably affixed to the mobile device and the like.

The distributed array may include at least one light emitting diode where the individual LED elements may be pivotal. The individual LED elements emitting light may converge to a focal point and or emit light diffusely. The mount may have a convex or concave shape with the individual LED elements forming a plane light output and or a Fresnel reflector expressing a respective convex or concave shape with the individual LED elements forming a plane light output. The distributed array having LED elements may for rows and columns as a Cartesian flash array, an interleaved honeycomb array and or a circular array.

The mount may be slidably connected to a mobile device and or foldable. The distributed array of light emitting points may be individually deformable about two rotatable axes. The distributed array of light emitting points may include areas of optical foci and include a light gathering sheet that gathers light from a light source and distributes the light to the areas of optical foci.

Furthermore, the relative position between the camera and the flash array may be arranged in various locations on the device. In one example the camera may be mounted at the top-left corner and the flash array mounted in the middle of the cell phone back, however the camera may be mounted at various places on the back of the cell phone and the flash array may be mounted at various places on the back of the cell phone.

Figure 13:
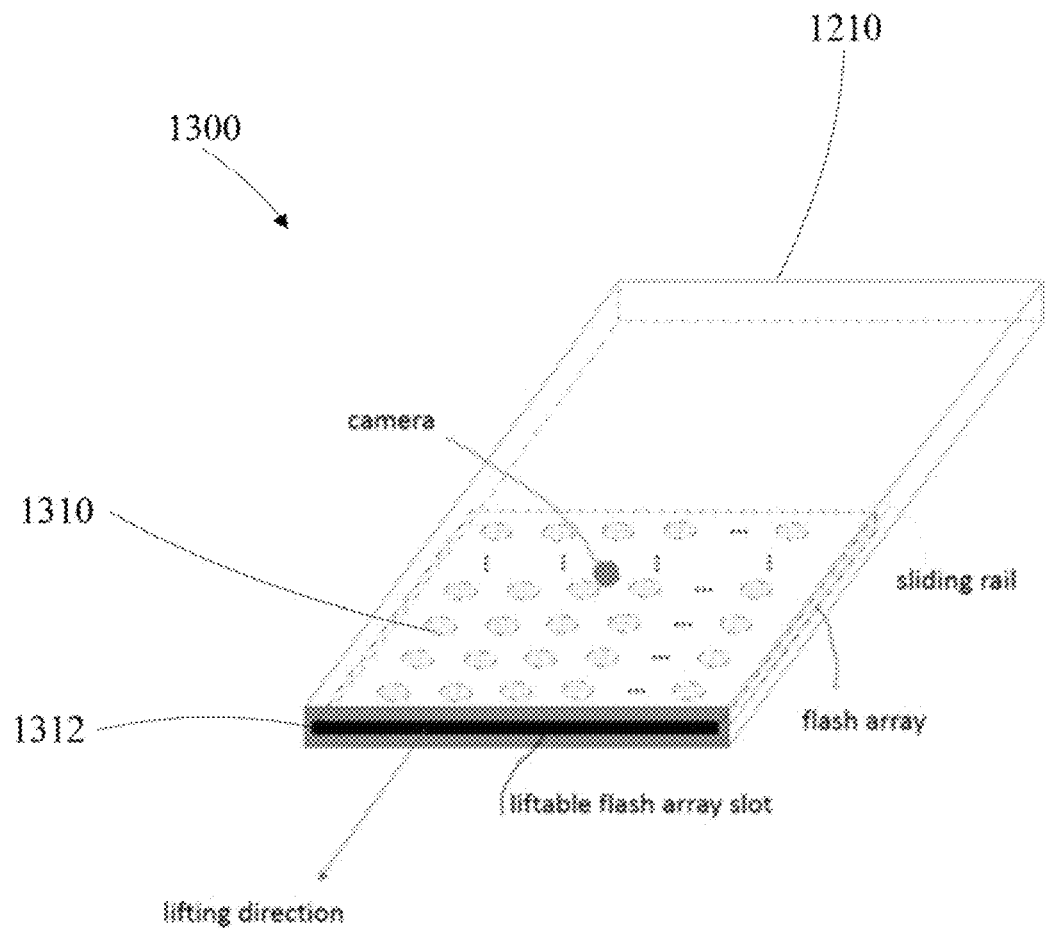
FIG. 13 depicts a two dimensional un-lifted flash array in accordance with one embodiment of the disclosure.
Figure 14:
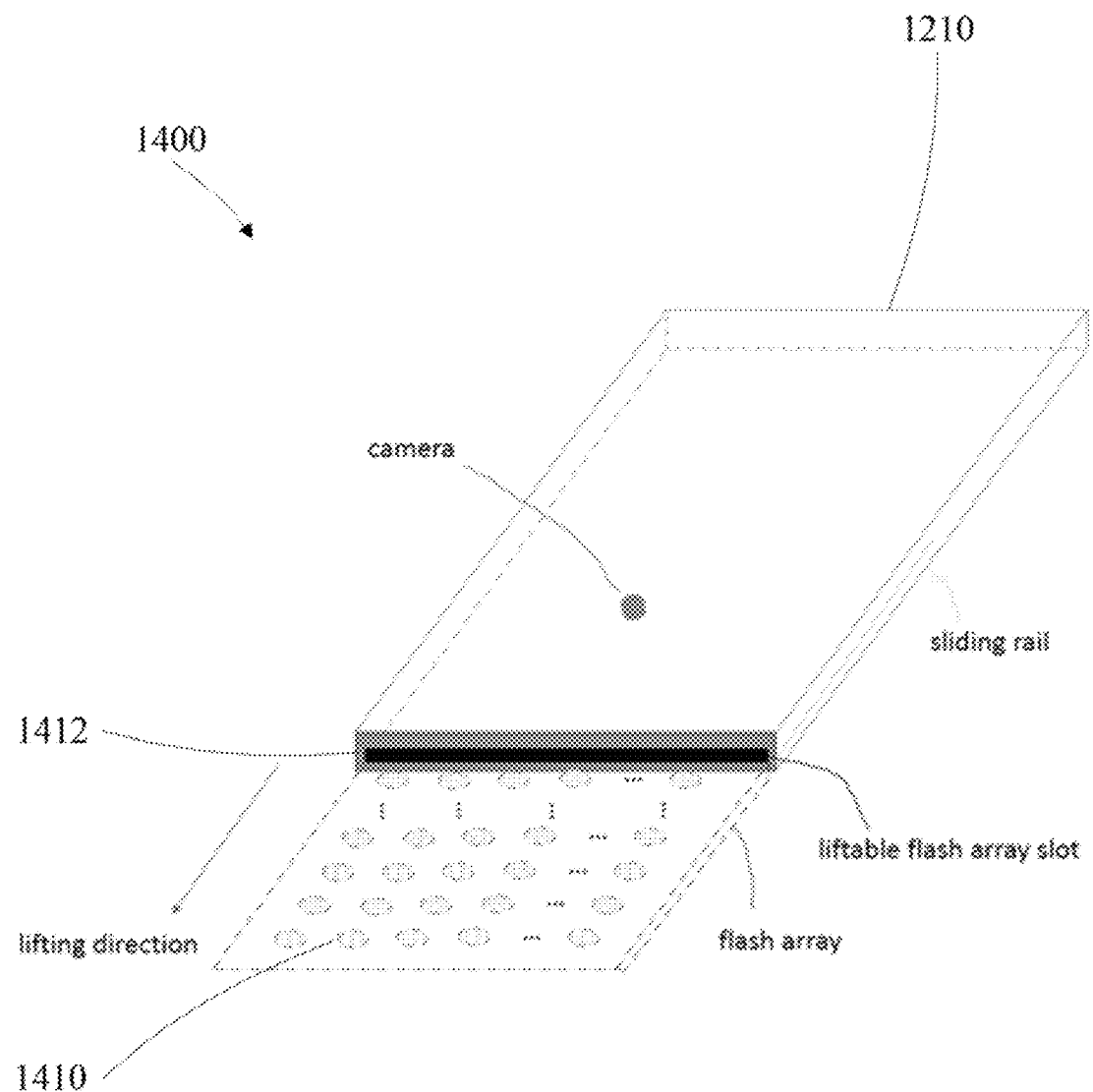
FIG. 14 depicts a two dimensional lifted flash array in accordance with one embodiment of the disclosure.

FIGS. 13 and 14 depict a perspective view of an example flash array that may be a thin structure which is hidden within the apparatus when not in use. In one example, the flash array may be mounted with a sliding rail, the flash array may be lifted outside the apparatus when the flash array is energized, as shown in FIG. 13.

The fixed or liftable mounting may be contained within a cell phone case, with an additional control/charging wire linking the array to the mobile device.

Figure 15:
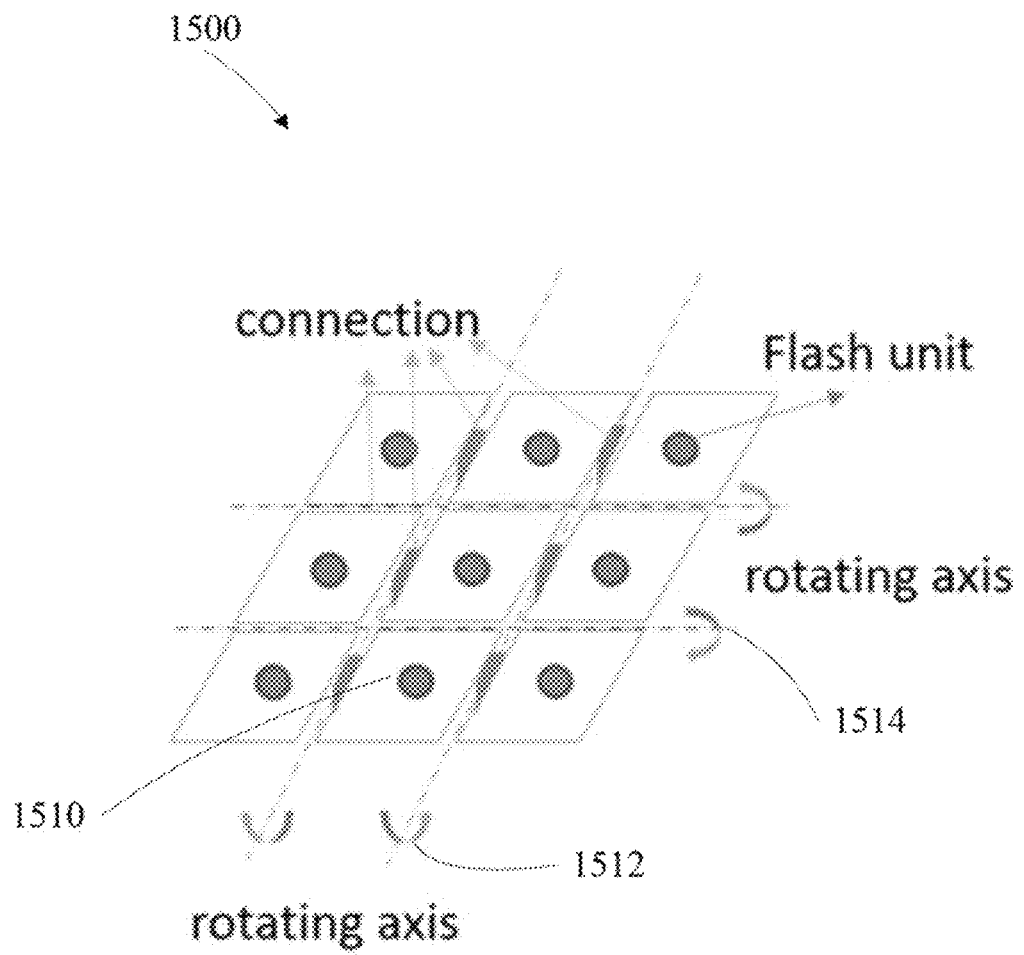
FIG. 15 depicts a two dimensional hinged flash array in accordance with one embodiment of the disclosure.

FIG. 15 depicts an example in which the mounting rig of FIG. 4 may be sectioned such that each of the flash units is movable as separate rigs coupled by hinge-like connectors 1512 and 1514 on the x and y axis respectively. The LED elements are connected by a hinge to the mount and are movable about an x axis and a v axis. The flash array may thus be adjusted to achieve a desired lighting effect such as converging, diverging, diffuse, and the like. By adjusting the individual flash unit rotations, the flash array may simulate a curved surface with a varying axis. In this example the individual flash units may be pivotal.

Figure 16:
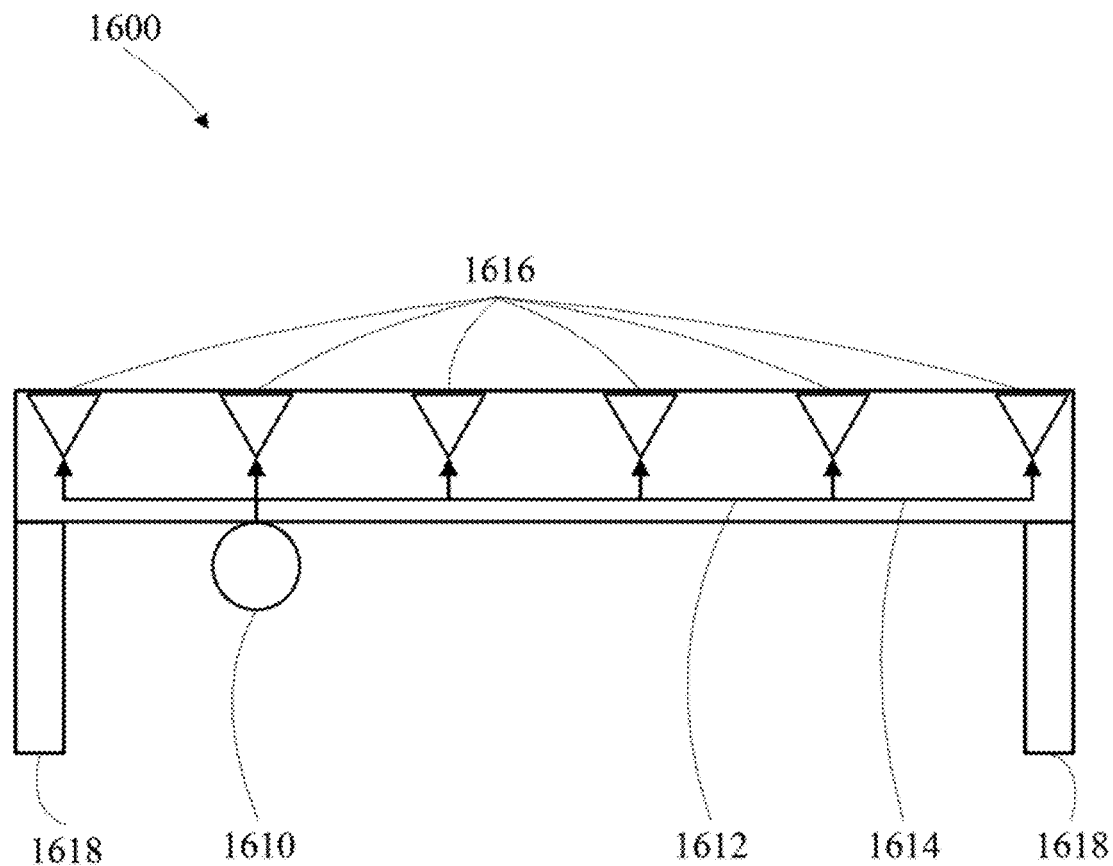
FIG. 16 depicts a two dimensional distributed light layer in accordance with one embodiment of the disclosure.

FIG. 16 depicts a cross-section view of a distributed light source that may be coupled to a mobile device and include a light gathering layer 1612 that gathers light from at least one light source 1610. The device includes a distributed array of light emitting optical foci 1616 that are optically coupled to the light gathering layer 1612 wherein the distributed array gathers light 1414 from the light gathering layer and distributes the light from the light emitting optical foci 1616. The device further includes a mount 1618 connected to the distributed array and couple-able to the mobile device. The distributed array may be capable of light emission from a plurality of discrete separated light emitting regions or areas or may be capable of light emission over an extended area.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that the specific order or hierarchy of steps in the processes disclosed is an illustration of example approaches. Based upon design preferences, it is understood that the specific order or hierarchy of steps in the processes maybe rearranged. Some of the steps may be performed simultaneously. The accompanying method claims present elements of the various steps in a sample order, and are not meant to be limited to the specific order or hierarchy presented.

The previous description is provided to enable any person skilled in the art to practice the various aspects described herein. The previous description provides various examples of the subject technology, and the subject technology is not limited to these examples. Various modifications to these aspects will be readily apparent to those skilled in the art, and the generic principles defined herein may be applied to other aspects. Thus, the claims are not intended to be limited to the aspects shown herein, but is to be accorded the fill scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the invention.

The predicate words "configured to", "operable to", and "programmed to" do not imply any particular tangible or intangible modification of a subject, but, rather, are intended to be used interchangeably. For example, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

A phrase such as an "aspect" does not imply that such aspect is essential to the subject technology or that such aspect applies to all configurations of the subject technology. A disclosure relating to an aspect may apply to all configurations, or one or more configurations. An aspect may provide one or more examples. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples. A phrase such as an "embodiment" may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples. A phrase such as a "configuration" may refer to one or more configurations and vice versa.

The word "example" is used herein to mean "serving as an example or illustration." Any aspect or design described herein as "example" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

References to "one embodiment," "an embodiment," "some embodiments," "various embodiments", or the like indicate that a particular element or characteristic is included in at least one embodiment of the invention. Although the phrases may appear in various places, the phrases do not necessarily refer to the same embodiment. In conjunction with the present disclosure, those skilled in the art will be able to design and incorporate any one of the variety of mechanisms suitable for accomplishing the above described functionalities.

It is to be understood that the disclosure teaches just one example of the illustrative embodiment and that many variations of the invention can easily be devised by those skilled in the art after reading this disclosure and that the scope of then present invention is to be determined by the following claims.

What is claimed is:

1. A flash array for a camera system, comprising
a two-dimensionally distributed array of flash units comprised of individual light emitting points; and
a mount connected to the two-dimensionally distributed array of flash units and couple-able to a cellular phone, the two-dimensionally distributed array of flash units being individually adjustable in their orientation such that a plane light source emission is simulated on an object to increase a uniformity of illumination of an object and extend a flash view angle on the object;
the two-dimensionally distributed array of flash units is mounted with a sliding rail, the sliding rail comprises a liftable flash array slot configured to lift the two-dimensionally distributed array of flash units out of the cellular phone when the two-dimensionally distributed array of flash units is energized.

2. The flash array of claim 1, wherein the two-dimensionally distributed array of flash units comprises individual LED elements emitting diffuse light.

3. The flash array of claim 2, wherein the mount has a convex shape with the individual LED elements.

4. The flash array of claim 2, wherein the mount has a concave shape with the individual LED elements.

5. The flash array of claim 1, wherein the two-dimensionally distributed array of flash units includes at least one light emitting diode.

6. The flash array of claim 1, wherein the two-dimensionally distributed array of flash units comprises individual LED elements hingedly connected to the mount and movable about an x axis and a y axis.

7. The flash array of claim 1, wherein the two-dimensionally distributed array of flash units comprises individual LED elements pointed to emit light converging to a focal point.

8. The flash array of claim 1, wherein the two-dimensionally distributed array of flash units comprises LED elements forming rows and columns.

9. The flash array of claim 1, wherein the two-dimensionally distributed array of flash units comprises LED elements forming an interleaved array.

10. The flash array of claim 1, wherein the two-dimensionally distributed array of flash units comprises LED elements forming a circular array.

11. The flash array of claim 1, wherein the two-dimensionally distributed array of flash units are hingedly connected to the mount and are movable about an x axis and a y axis.

12. The flash array of claim 1, wherein the two-dimensionally distributed array of flash units includes a light gathering sheet that gathers light from the light emitting points and distributes it to areas of optical foci that focus the gathered light at final points.

13. A flash array for a camera system, comprising:
a light gathering layer configured to gather light from at least one light source;
a two-dimensionally distributed array of flash units comprised of light emitting diodes optically coupled to the light gathering layer, wherein the two-dimensionally distributed array of flash units gathers light from the light gathering layer and outputs the light from the light emitting diodes to increase a uniformity of illumination of an object and extend a flash view angle on the object; and a mount connected to the two-dimensionally distributed array of flash units and couple-able to a cellular phone, the two-dimensionally distributed array of flash units being, individually adjustable in their orientation such that a plane light source emission is simulated on an object;

the two-dimensionally distributed array of flash units is mounted with a sliding rail, the sliding rail comprises a liftable flash array slot configured to lift the two-dimensionally distributed array of flash units out of the cellular phone when the two-dimensionally distributed array of flash units is energized.

14. The flash array of claim 13, wherein the mount is slidably connected to the cellular phone.

* * * * *